United States Patent [19]

Dewar

[11] Patent Number: 4,541,721
[45] Date of Patent: Sep. 17, 1985

[54] OPTICAL CHECKING APPARATUS AND METHOD OF USING SAME

[75] Inventor: Robert Dewar, Troy, Mich.

[73] Assignee: Perceptron, Inc., Farmington Hills, Mich.

[21] Appl. No.: 476,431

[22] Filed: Mar. 17, 1983

[51] Int. Cl.[4] .................... G01B 11/00; G01B 11/14
[52] U.S. Cl. .................................. 356/375; 356/376; 356/384
[58] Field of Search ............... 356/1, 372, 375, 376, 356/384, 371, 373

[56] References Cited

U.S. PATENT DOCUMENTS

| 2,984,147 | 5/1961 | Schoepe et al. | 356/375 |
| 3,591,291 | 7/1971 | Greer et al. | 356/371 |
| 3,967,114 | 6/1976 | Cornillault | 356/371 |

FOREIGN PATENT DOCUMENTS

| 114705 | 9/1981 | Japan . |
| 191505 | 11/1982 | Japan . |
| 1449044 | 9/1976 | United Kingdom . |

Primary Examiner—R. A. Rosenberger
Assistant Examiner—Michael F. Vollero
Attorney, Agent, or Firm—Harness, Dickey & Pierce

[57] ABSTRACT

Apparatus for optically checking both the gap between two adjacent parts such as the hood-to-fender fit of a vehicle and the surface flushness of the parts employs a hand-held fixture which is adapted to engage edges of the part in order to orient the fixture in a preselected position relative to the gap. A laser and related optical system mounted on the fixture directs a line of collimated light onto the parts and across the gap. The optical system and a television camera on the fixture pick up light reflected from the parts surfaces and generate an image using the triangulation technique which contains measurement information relating to the size of the gap and the degree of surface flushness. A computerized controller converts the image to measurement data that is displayed on a CRT. The control system is used in a part fitting method to select and display the identity of any of a plurality of shims which on an assembly person may employ to create proper fit between the parts.

18 Claims, 8 Drawing Figures

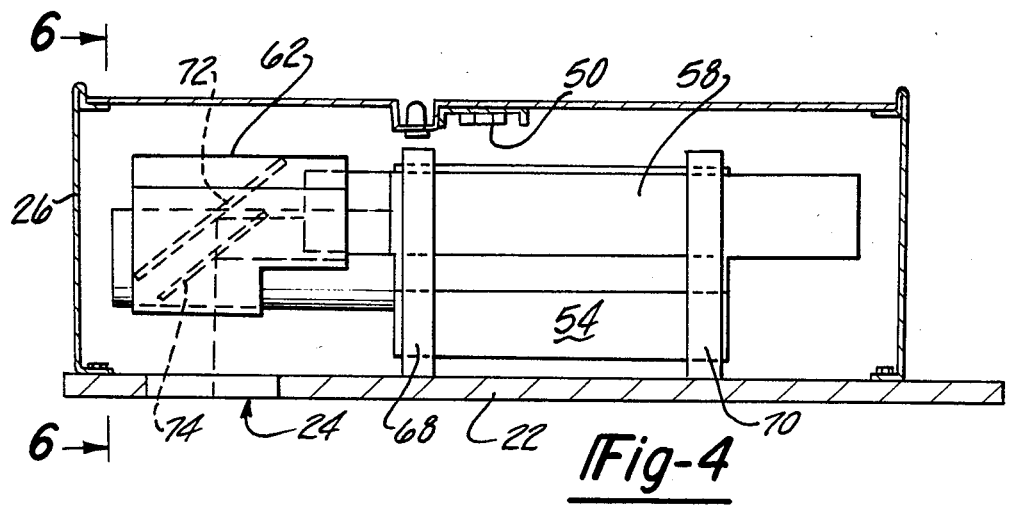
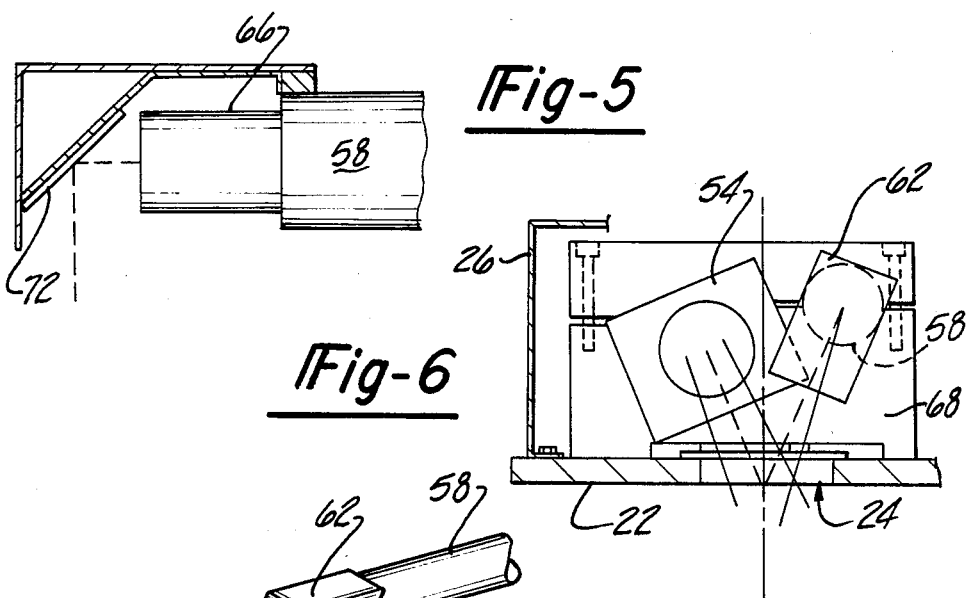
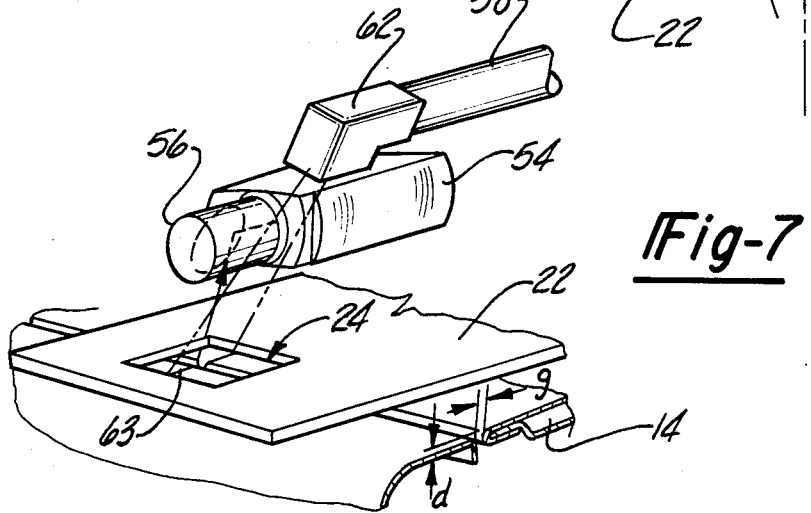

OPTICAL CHECKING APPARATUS AND METHOD OF USING SAME

DESCRIPTION

1. Technical Field

The present invention broadly relates to optical inspection and checking devices and deals more particularly with apparatus for measuring the gap between two parts as well as the surface flushness of the parts.

2. Background Art

In the past, in order to ensure a proper fit between two parts such as that between the hood and fender of a vehicle, it has been necessary to employ a mechanical checking device often referred to as a "gap gage". These mechanical gap gages are less than completely satisfactory for a number of reasons including a lack of accuracy and reliability, high maintenance costs, the possiblity for measurement error due to malfunction and wear, etc. These disadvantages are exacerbated by the fact that the parts being measured or checked are often on an automated assembly line which limits the time an operator can devote to carrying out the measurements and assemblying the parts to provide a proper fit therebetween.

Various types of non-contacting "optical checking systems" have been devised in the past to measure and locate various features of parts or a workpiece. Known systems of this type are sometimes used in applications where the parts for workpiece are moving along an assembly line or conveyor. In these applictions, the optical checking system is stationarily mounted along the path of travel of the workpiece and the workpiece is mounted on a fixture such that its position is known relative to the optical checking system during the measurement process. However, these types of optical checking systems are not suitable for use in many applications where the workpiece or parts to be checked or measured are not mounted in fixed, known relationship to the optical checking system. A typical example of such an application involves fitting a hood between the fenders of a vehicle on a moving assembly line. Heretofore, although mechanical gap gages have sometimes been employed to measure the gap between the fenders and hood and no means have been provided to quantitatively check the flushness between the hood and fenders.

The present invention is directed toward overcoming each of the deficiencies of the prior art discussed above.

According to the present invention, apparatus for optically checking both the gap between two adjacent parts such as the hood-to-fender fit of a vehicle and the surface flushness of the parts employs a hand held fixture which is adapted to engage edges of the part in order to orient the fixture in a predetermined position relative to the gap. A laser and associated optical system mounted on the fixture direct a line of collimated light onto the parts and across the gap. A video camera and related optical system mounted on the fixture pick-up the light reflected from the part surfaces and generate an image that contains measurement information relating to the size of the gap and the degree of surface flushness. Mechanically operated electrical switches on the fixture are actuated when the fixture is properly oriented on the parts and function to inhibit operation of the laser unless the fixture is properly positioned. A computerized controller converts the image to measurement data that is displayed on a cathode ray tube. The controller is used in a part fitting method to select and display the identity of any of a plurality of shims which an assembly line worker may employ to create the proper fit between the parts. The controller also collects and stores historical data related to measurements taken for a number of parts over a period of time.

Accordingly, it is a primary object of the present invention to provide an optical checking apparatus which measures both the gap between two adjacent, spaced parts as well as the surface flushness of such parts.

Another object of the invention is to provide apparatus as described above which is hand held and includes an optical system which is properly oriented by positioning a fixture on which it is mounted relative to the parts to be checked.

Another object of the invention is to provide apparatus as described above which provides rapid readout of the measured data, including information or instructions for enabling an assembly person to alter the position of the parts so as to create a proper fit therebetween.

A still further object of the present invention is to provide apparatus as described above which includes a computerized controller for controlling the operation of several measuring fixtures.

Another object of the present invention is to provide a method of fitting a pair of parts relative to each other which employs an optical checking system for measuring the gap between the parts and automatically identifying a shim size that will provide a proper fit between the parts.

These, and further objects of the invention will be made clear or will become apparent during the course of the following description of a preferred embodiment of the present invention.

BRIEF DESCRIPTION OF THE DRAWINGS

In the drawings, which form an integral part of the specification and are to be read in conjunction therewith, and in which like reference numerals are employed to designate identical components in the various views:

FIG. 4 is a sectional view taken along the line 4—4 of FIG. 1;

FIG. 5 is a fragmentary view of one end of the laser and related optical system, parts of the optical system being broken in section to reveal the path of collimated light emanating from the laser;

FIG. 6 is a sectional view taken along the line 6—6 in FIG. 4;

FIG. 7 is a perspective view of the optical checking fixture, the housing and support brackets having been removed to display the orientation of the video camera relative to the laser and the parts being checked; and, FIG. 8 is a combined diagrammatic and schematic diagram of the circuit for interconnecting the laser and video camera with the computerized controller.

BEST MODE FOR CARRYING OUT THE INVENTION

Figure 1:
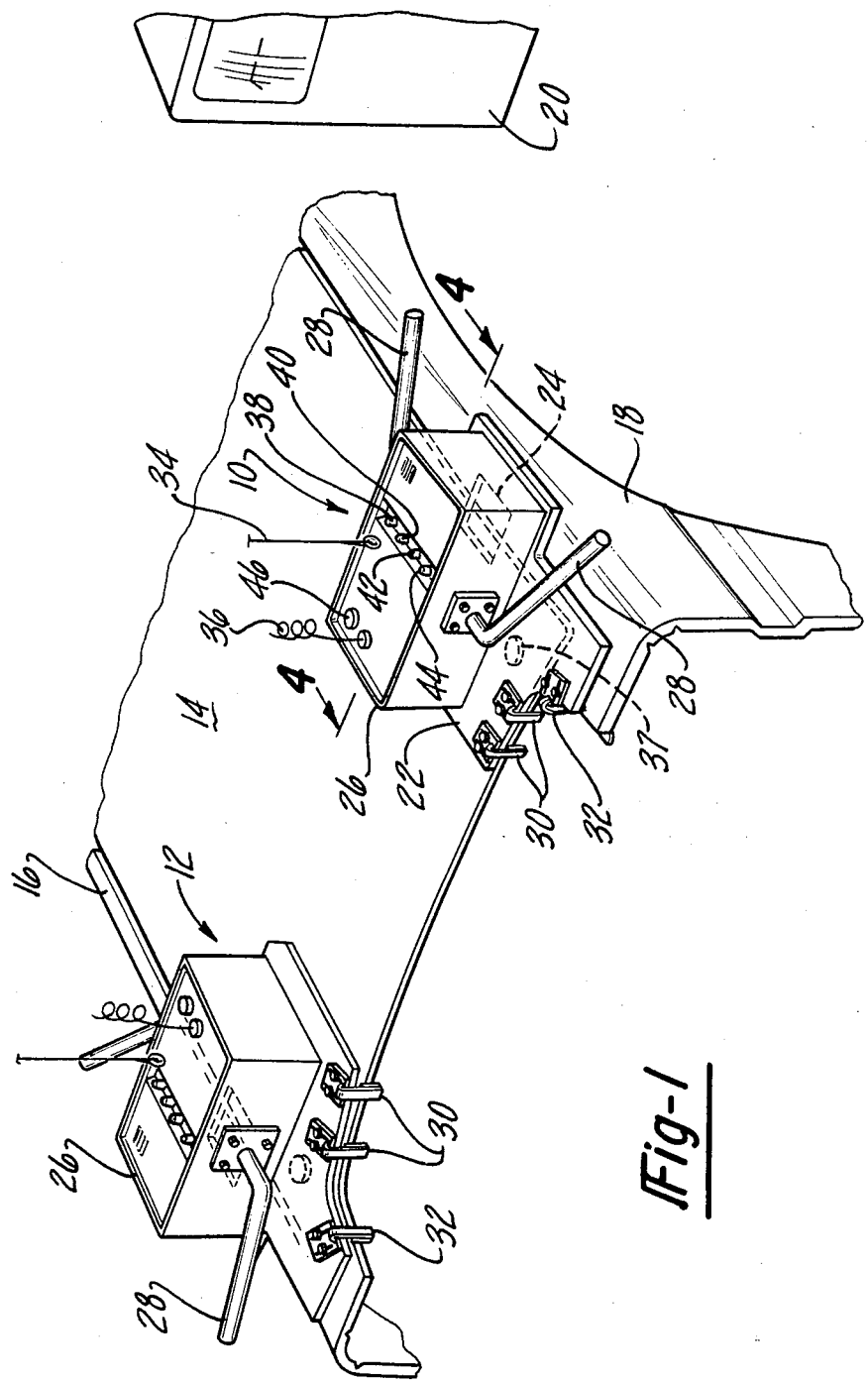
FIG. 1 is a perspective view of a pair of optical checking fixtures in accordance with the present invention, shown mounted in operative relationship on the opposite sides of a vehicle fender for use in measuring the gap and flushness of the hood-to-fender fit.

Referring now to the drawings, the present invention broadly involves an optical checking system for measuring the fit between the surfaces of two parts or workpieces; as shown in FIG. 1, the apparatus is adapted to measure both the gap between and surface flushness of a vehicle hood 14 and fenders 16,18. The apparatus employs a pair of portable checking fixtures generally indicated by the numerals 10 and 12 which send information to and receive control signals from a computerized controller 20. Checking fixture 10 is adapted to check both the gap "g" and flushness "d" between one lateral edge of the hood 14 and fender 18. The other optical checking fixture 12 is simply a mirror image of fixture 10 and is adapted to check the gap "g" and flushness "d" of the other lateral edge of the hood 14 and fender 16.

Fixture 10 includes a substantially flat base plate 22 which flushly rests on the adjacent surfaces of hood 14 and fender 18, and includes a rectangularly shaped cutout 24 overlying the gap "g". Downwardly depending locator stops 30,32 are secured to one edge of base plate 22 and engage respectively associated edges of the hood 14 and fender 18, thereby orienting the base plate 22 in a preselected position.

A laser 58 and video camera 54 are mounted in side-by-side relationship by means of a pair of spaced apart mounting brackets 68 and 70 which are secured to the upper surface of base plate 22. The optical axes of the laser 58 and camera 54 extend parallel to each other and transverse to the direction of the gap "g". Laser 58 provides a source of collimated light and includes an optical head 62 which converts the beam into a collimated line of light 63 which is directed by a mirror 72 through the hood 14 and fender 18. The line of light 63 therefore impinges on the lateral edges of the hood 14 and fender 18 and extends substantially perpendicular to and across the gap "g". The optical head also includes an electrically operated shutter which controls the output of light from the laser 58. Light reflected from the line 63 is received within an optical head 56 of camera 54. Optical head 56 includes an mirror 74 which directs the reflected light onto the optical axis of the camera 54. The camera 54 may be conventional in design and includes a matrix type array of photosensitive elements and appropriate lenses to direct the reflected light onto the array. The image produced by the camera 54 provides a means by which the gap "g" and flushness "d" may be measured.

A substantially rectangular housing 26 is mounted on base plate 22 and protectively encloses the laser 62 and camera 54. A pair of handles 28 mounted on opposite sides of the housing 26 are provided to allow an operator to move the fixture 10 toward and away from the parts to be checked. A line 34 secured to housing 26 may be connected with a counterweight, if desired, so as to suspend the fixture 10 when not in use and relieve a portion of the weight of the fixture 10, thereby facilitating handling and manipulation thereof by an operator.

Each of the fixtures 10,12 is provided with a plurality of mechanically operated, electrical switches 48 which may be positioned adjacent to or be formed integral with the location stops 30,32. A flushness switch 37, connected in series with switches 48, is mounted on the bottom of base plate 22 is normally open but is closed when the base plate 22 flushly engages the hood 14 and fender 18. Switches 37,48 are adapted to be switched to a closed position when the stops 30,32 engage the edges of the parts being checked and the base plate 22 is in a proper orientation relative to the parts. As will become apparent hereinafter, measurements may not be taken until all of the normally open switches 37,48 are closed. A conventional mecury switch 50 mounted on the housing 26 is connected in series with switches 37,48. Mercury switch 50 is normally closed but is switched to an open position in the event that the fixture 10 is tilted beyond a prescribed angle; this feature prevents possible injury from the laser 58 in the event that the fixtures are inadvertently tilted during manipulation thereof.

A plurality of status lights 38, 40, 42, and 44 is mounted on top of the housing 26 and act to alert the operator as to the operating status of the apparatus as will be discussed in more detail below. An audio generator 46 also mounted on the housing 26 operates to provide an audible signal in combination with light 38.

Figure 3:
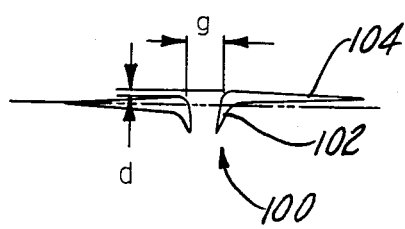
FIG. 3 is a view of an image formed by the video camera in the checking fixture.
Figure 8:
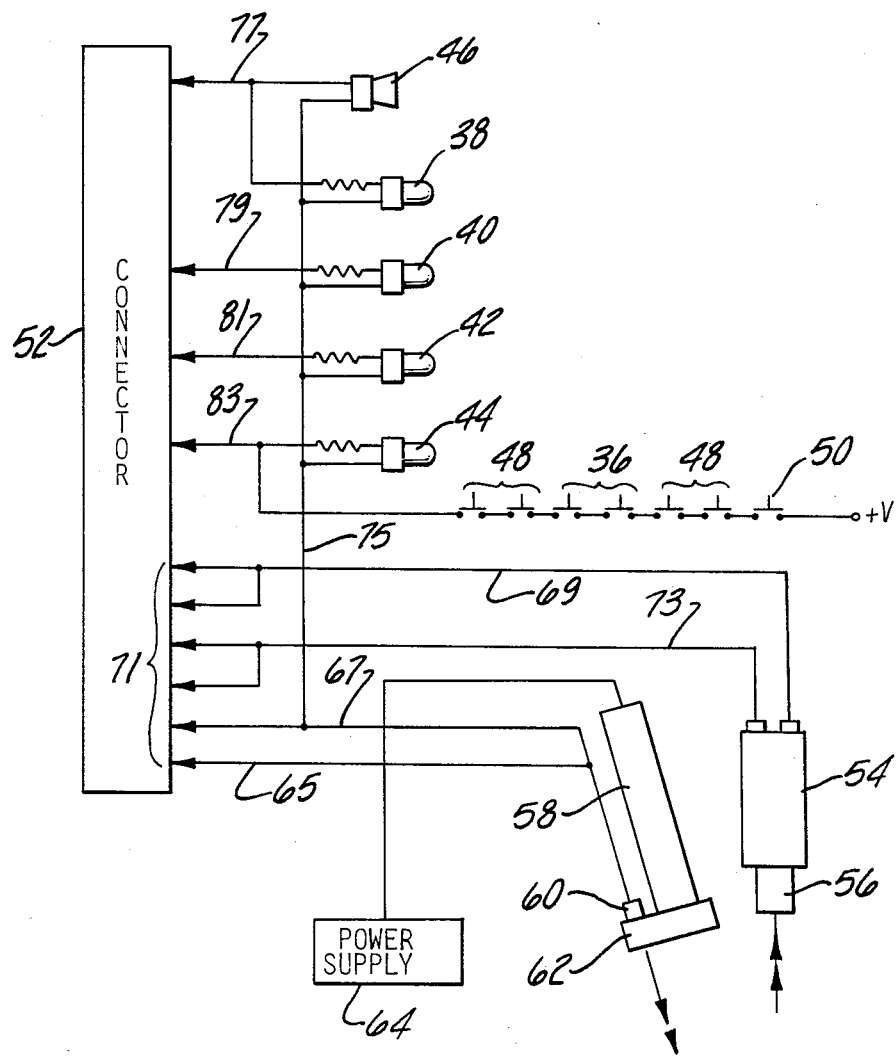

Reference is now made particularly to FIG. 8 which depicts the circuit for electrically connecting the fixture 10 with the computerized controller 20. The electrical components of the fixture 10 are coupled to a connector 52 which in turn is connected to a multiwire cable 36. Cable 36 (FIGS. 1 and 3) electrically connects the fixture 10 with the controller 20. The laser 58 is powered by a source of electrical power 64 and the electrically operated shutter in optical head 62 is controlled by a solenoid 60 which is connected to the controller 20 via line 65 and to ground via line 67. Analog video signals are delivered from the camera 54 via line 69 to the connector 52. Line 73 coupled between the connector 52 and camera 54 functions as a ground connection. Lines 65, 67, 69 and 73 terminate in connector pins 71 which define sensor inputs/outputs, i.e., video signals are delivered to the controller 20 from the camera 54 and control signals for operating the laser 58 and shutter 62 are received from the controller 20.

Lights 37–44 and audio generator 46 are coupled to ground via line 75 and are also coupled to the controller 20 via the connector 52 and corresponding lines 77, 79, 81, and 83. Switches 48 and 50 are coupled between a positive supply of voltage and line 83.

Figure 2:
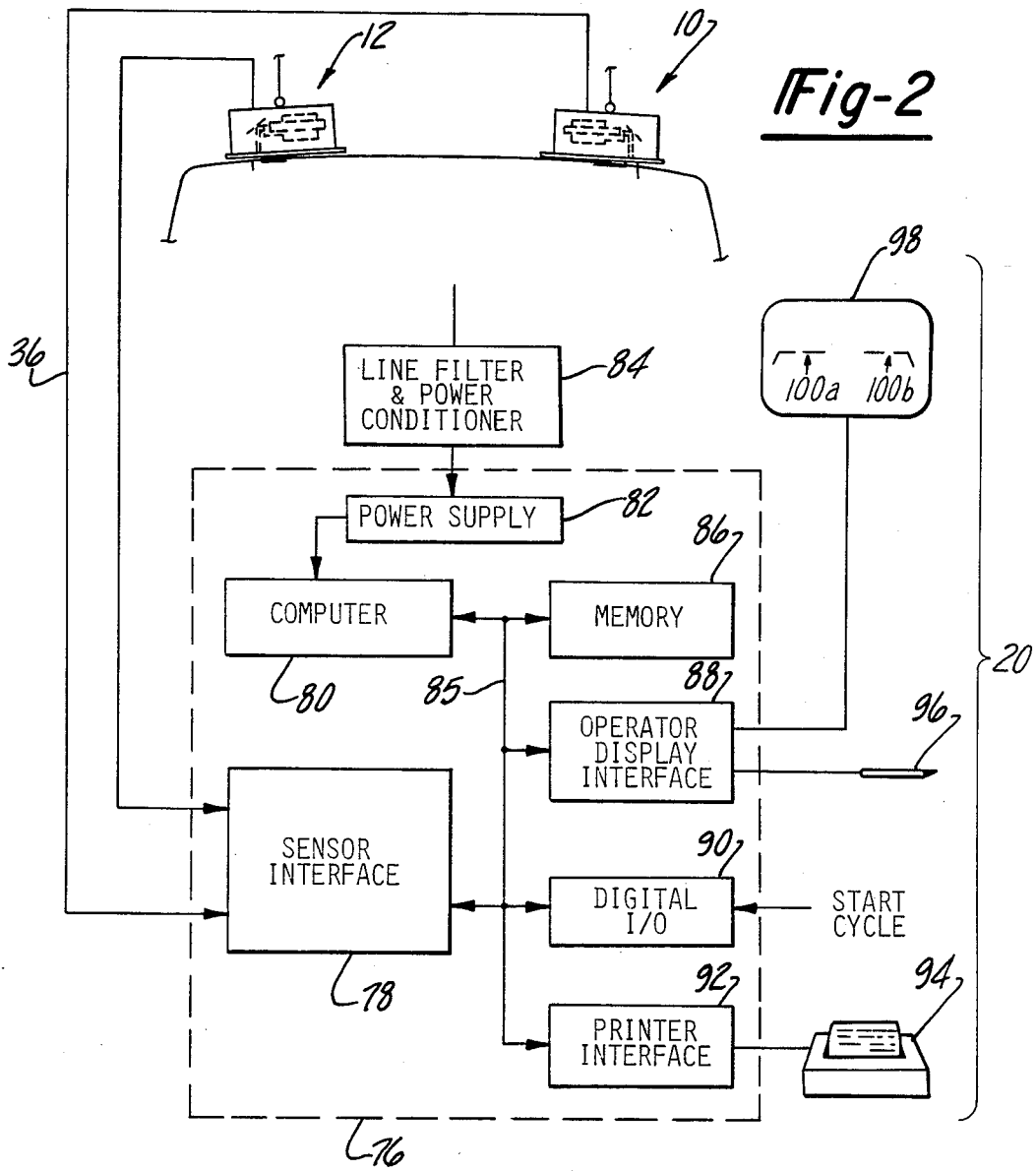
FIG. 2 is a combined diagrammatic and block diagram of the optical checking apparatus of the present invention.

Referring now particularly to FIG. 2, the controller 20 includes a control circuit 76, a cathode ray tube (CRT) 98, a light pen 96 and a printer 94. The circuit 76 includes a sensor interface 78 for interfacing the fixtures 10,12 with a central data bus 85. Data bus 85 interconnects a computer 80 with a memory 86, operator display interface 88, a digital input/output 90 and a printer interface 92. Computer 80 may comprise an LSI 1123 16 bit microcomputer with an accompanying power supply 82 and line filter and power conditioner 84. Memory 86 may include a programmable read-only memory for storing programs which are unique to each particular application of the optical checking apparatus. Memory 86 may also include a memory device, such as a cassette tape driven system for storing measurement and inspection parameters taken by the fixtures 10,12 over a period of time. The operator may employ the light pen in combination with the CRT to select the operating procedure of the controller 20 and to input data to the computer 80.

In operation, a measurement cycle is initiated by an operator grasping handles 28 and moving the fixture 10 into operative position engaging the upper surfaces of hood 14 and fender 18. The operator positions the base plate such that the stops 30,32 engage the appropriate edges of the hood 14 and fender 18, and the bottom of base plate 22 flushly engages the hood 14 and fender 18, whereupon switches 37,48 are closed thereby delivering a signal on line 83 to the controller 20. With the base plate 22 properly oriented, the enabling signal on line 83 results in the controller 20 enabling the laser 58 and opening the optical shutter in the optical head 62. Laser 58 delivers a line 63 of collimated light onto the adjacent surfaces of hood 14 and fender 18, and across the gap "g". It can be readily appreciated that the light reflected to the camera 54 forms an image of the gap "g" which can be compared to a value stored in memory 86 by the controller 20. Moreover, it can also be appreciated that in the event that the hood 14 and fender 18 are not flush, i.e., at the same height relative to each other, the light reflected from the surface of the hood 14 to the camera 54 will be at an angle different from that of a light reflected from the fender 18. The memory 86 includes a program for calculating the flushness or distance, "d", using conventional triangulation techniques. The triangulation calculation are based on the fact that the camera 54 and laser 58 are mounted in fixed, angular relationship to each other. Consequently, since the camera 54 is at a known angle relative to the laser 58, its image is distorted by the shape of the surface being viewed.

The image processed by the controller 20 is displayed on CRT 98 for the operator to view. A pair of images 100a and 100b produced by the corresponding checking fixtures 10 and 12 each include a pair of spaced apart, horizontal legs 104 and general vertical legs 102. The difference in height between the horizontal legs 104 corresponds to the flushness or distance "d", while the distance between the vertical legs 102 corresponds to the gap width "g". Although not specifically shown on the CRT 98, the controller may be programmed to also numerically display the value of the gap width and surface flushness as well as a "go no go" visual signal which tells the operator that the measurements taken are within the range of acceptable parameters for the gap width or flushness which have been programmed into the memory 86. The measurement data processed by the controller 20 may be recorded for historical or later statistical analysis, or printed out on hard copy by the printer 94.

As previously indicated, the lights 38-44 and audio generator 46 provide the operator with information concerning the operational status of the apparatus. Upon closure of switches 36 and 48, light 44 is energized thereby indicating that the apparatus is enabled and that the fixture 10 is properly positioned. Light 42 is operated by the controller 20 and provides an indication that the controller 20 has been reset following the last measurement taken and is ready to receive and operate on the next set of measurement data. Light 40 provides the operator with an indication that the laser 58 is enabled, i.e., the solenoid operated shutter is open. Light 40 will be turned off in the event that the mercury switch 50 is opened. The light 38 and audio generator 46 are energized following the transmission of optical data from the fixture 10 to the controller 20, i.e., these devices alert the operator that data has been taken.

The optical checking apparatus described above may be employed in an novel method for properly fitting a hood between a pair of fenders on an automated assembly line wherein the fit between the hood and fenders may be adjusted by installing one or more of any of a plurality of differently sized shims in means for mounting the hood on the vehicle. The controller 20 may include a preprogrammed look-up table (memory) which selects a particularly shim size in accordance with the measurement data taken by the fixture 10. In accordance with this method, after data is taken by the fixture 10, the CRT 98 will display a shim size or number which the assembly line worker then installs into the mounting means in order to provide the proper gap between the fender and hood. Thus, it may be appreciated that the method described above comprises the steps of developing optical patterns by optically inspecting the gap between the hood and at least one fender, converting the optical patterns to electrical data corresponding to the gap and then automatically identifying one or more of a plurality of shims needed to create a proper fit between the hood and fender using the electrical data.

From the foregoing, it is apparent that the optical checking apparatus described above not only provides for the reliable accomplishment of the objects of the invention but does so in a particularly effective and economical manner. It is recognized, of course, that those skilled in the art may make various modifications or additions to the preferred embodiment choosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:

1. Apparatus for determining the magnitude of the gap between two adjacent, spaced apart surfaces and/or for determining the height of one of said surfaces relative to the other of said surfaces, comprising:
    a base adapted to be removably supported on at least one of said surfaces
    first means mounted on said base for delivering a line of collimated light onto said surfaces and transversely across said gap;
    means for aligning said line of light relative to said gap, said aligning means including means for orienting said base in a preselected position on one of said surfaces;
    second means mounted on said base for sensing reflections of said line of light from said surfaces and for converting said reflections to electrical signals;
    means for inhibiting the operation of one of said first and second means until said base is in said preselected position thereof; and
    third means for calculating the magnitude of said gap and/or the height of said one surface relative to the other of said surfaces using said electrical signals.

2. The apparatus of claim 1, wherein said aligning means includes at least one stop on said base for engaging an edge on at least one of said surfaces, and
    said inhibiting means includes an electrical switch mounted on said base and operated by the movement of said stop into engagement with said edge.

3. The apparatus of claim 2, wherein said inhibiting means includes an optical shutter for selectively blocking the delivery of collimated light to said surfaces, said shutter being controlled by said electrical switch.

4. The apparatus of claim 1, including a pair of handles connected with said base and adapted to be gripped by a user for moving said base into and away from said preselected position.

5. The apparatus of claim 1, wherein said first means includes a laser source, and said second means includes a video camera.

6. The apparatus of claim 5, wherein said laser source includes a first optical axis along which said collimated light beam is delivered and said video camera includes a second optical axis along which reflected light is received, said first and second optical axes extending substantially parallel to each other.

7. The apparatus of claim 1, including a cathode ray tube for displaying data related to said magnitude of said gap and said height of said one surface and wherein said third means includes a programmed computer.

8. Apparatus for optically inspecting the position of two surfaces relative to each other, said surfaces being spaced apart to define a gap therebetween, comprising:
a hand held, portable assembly adapted to be supported on said workpiece surfaces, said assembly including
a base plate having a surface engagable with each of said surfaces,
a plurality of stops mounted on said base for engaging edges of said surfaces and holding said base plate in a preselected position relative to said surfaces,
a source of collimated light,
means for directing collimated light from said source onto said workpiece surfaces,
means for receiving light reflected from said workpiece surfaces and originating from said source,
means for converting the reflected light received by said receiving means to electrical signals;
means for converting said electrical signals into data representing the positions of said surfaces relative to each other.

9. The apparatus of claim 10, wherein:
said source includes a laser,
said converting means includes an array of photosensitive electrically responsive elements each outputting an electrical signal upon receipt thereto of light reflected from said surfaces,
said receiving means includes an optical element for directing said reflected light onto said array, and
said assembly includes means for mounting said laser and said receiving means on said base plate.

10. The apparatus of claim 9, wherein said laser and said optical element include optical axes along which light is respectively transmitted and received, said optical axes extending substantially parallel to each other.

11. The apparatus of claim 10, wherein:
said optical axes extend substantially parallel to said workpiece, and
said assembly includes first and second mirrors respectively associated with said optical axes, said first mirror being oriented to reflect light at an angle relative to the corresponding optical axis toward said workpiece surfaces, said second mirror being oriented to reflect light reflected from said workpiece surfaces along the corresponding optical axis toward said optical element.

12. The apparatus of claim 10, including:
means for sensing when said base plate is in said preselected position thereof and for producing an electrical control signal when said base plate is in said preselected position thereof, and
means responsive to said control signal for controlling the operation of said light source.

13. The apparatus of claim 8, wherein said means for converting the reflected light received by said receiving means to electrical signals includes:
means for computing said data in accordance with preprogrammed instructions,
a set of preprogrammed instructions for controlling said computing means, and
means for displaying said data.

14. Apparatus for successively checking the surface flushness and/or gap between a plurality of pairs of spaced apart surfaces, comprising:
a hand held optical checking fixture having surfaces for engaging edge portions of said surfaces to orient said fixture in a preselection position relative to said gap;
a pair of handles for shifting said fixture toward and away from said surfaces,
means carried by said fixture for directing a line of collimated light onto said part surfaces and across said gap;
means carried by said fixture for receiving the light reflected from said surfaces originating from said directing means, the angle of reflection of said reflected light and the width of said reflected light on opposite edges of said gap being respectively related to the flushness and size of said gap; and
means for converting said reflected light into data corresponding to the degree of said flushness and/or magnitude of said gap includes a programmed computer and display means for displaying said data, said display means and said computer being mounted stationarily relative to said fixture.

15. For use in assembling a vehicle having a hood or the like positioned between and slightly spaced from a pair of fenders or the like, apparatus for checking the fit between said fenders and said hood, comprising:
first and second optical checking fixtures respectively movable into contact with said fenders and portions of said hood for checking the size of the gap between said hood and the corresponding fender and the degree of surface flushness between said hood and the corresponding fender,
each of said checking fixtures including means for directing collimated light onto a portion of the surface of said hood and the corresponding fender, means for receiving light reflected from said hood surface and corresponding fender, and means for generating said electrical signals corresponding to position on said surface from which the light is reflected using said reflected light, each of said fixtures includes means for locating the corresponding fixture in a preselected location relative to said hood and the associated fender, said locating means includes at least a pair of stops for respectively engaging an edge of said hood and an edge of the corresponding fender; and
means for converting the electrical signals from each of said checking fixtures into data corresponding to the size of said gap and said degree of surface flushness between said hood and each of said fenders.

16. The apparatus of claim 15, wherein said directing means includes means for directing said colimated light into a line of light impinging on said surface and extending transversely across said gap.

17. The apparatus of claim 15, wherein said converting means includes a programmed computer mounted stationary relative to said first and second fixtures.

18. The apparatus of claim 15, including a pair of graphic displays respectively associated with said fixtures for displaying data associated with the corresponding fender-to-hood fit.

* * * * *